June 19, 1934.  C. RORABECK  1,963,249
CHAIN AND SPROCKET
Filed Jan. 2, 1931
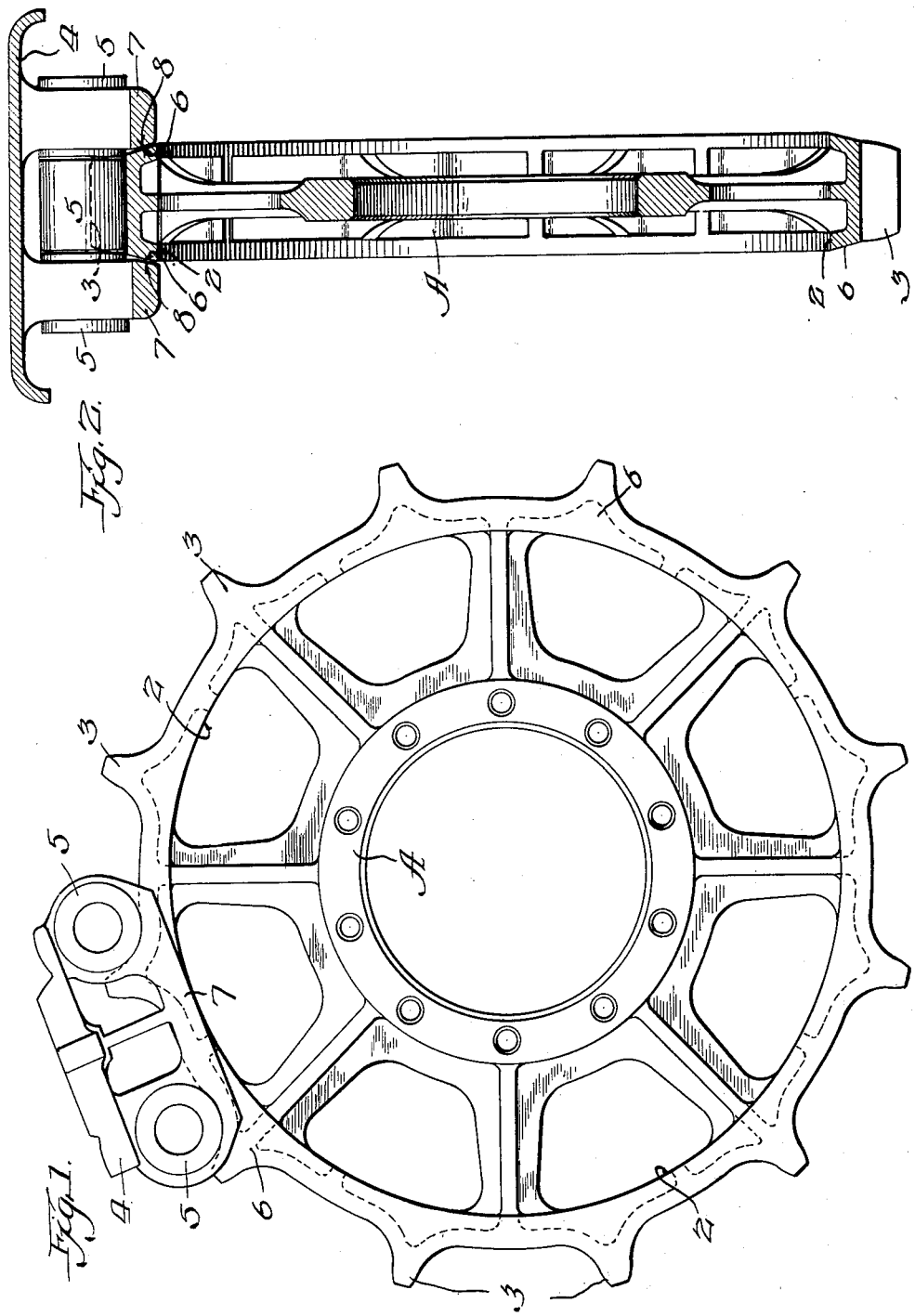
Inventor:
Claude Rorabeck.
By Wilkinson, Huxley, Byron & Knight,
Attys.
Witness:
C. B. Davison.

Patented June 19, 1934

1,963,249

UNITED STATES PATENT OFFICE 1,963,249

CHAIN AND SPROCKET

Claude Rorabeck, Chicago Heights, Ill.

Application January 2, 1931, Serial No. 506,083

4 Claims. (Cl. 74—31)

This invention relates to a construction whereby the links which enter into an endless chain are coordinated with their sprockets by which they are guided in their travel, and has for its object to bring about a relation between the links of the chain and the sprocket which will avoid destructive wear between these two elements of the organization.

In chains and sprockets as heretofore constructed, the teeth of the sprockets have generally been permitted to contact with inside surfaces of the chain in a manner to wear away both the said teeth and the said surfaces and materially reduce the life of the elements. Attempts to overcome this by letting the side rail of the link overlap the rim of the sprocket wheel have resulted in excessive friction and wear between the overlapping parts, due to the fact that there were usually wide surfaces of contact and to the fact that there was an extensive sliding movement between the two surfaces.

According to the present invention, the links of the chain and the rim of the sprocket wheel are provided with bearing faces which are radially nearer the center of the wheel than the teeth, and which surfaces, as well as the parts of the links and sprocket radially more remote, are so designed that thrust in the lateral direction or direction of the axis of the wheel is taken up entirely by these special bearing surfaces provided for the purpose. Moreover, these bearing surfaces are constructed at such angles to the plane of the sprocket wheel as to facilitate mating of the parts or the riding of the links of the chain up upon the rim of the sprocket.

In the accompanying drawing, in which the preferred embodiment is shown by way of illustration—

Figure 1 is a side elevation of a sprocket wheel with one link of a chain appropriate thereto, constructed in accordance with the present invention.

Figure 2 is a diametric section through the sprocket and link of Figure 1.

A represents a sprocket wheel of any approved type, constructed with a rim 2 and teeth 3, and 4 represents a link of an endless chain to be supported and guided by the wheel A. It is customary to construct the links of such a chain with hub portions 5 through means of which the links engage the teeth 3 in establishing driving connection between the wheel and the chain, or vice versa. In many uses to which chains and sprockets of this kind are put, for instance, when the chains are used as endless tracks for tractor vehicles, the chain encounters many forces which cause it to transmit serious stresses to the sprocket. According to the present invention, the rim 2 is constructed with outwardly presented link-guiding faces 6, and the link 4 is constructed with side rails 7 designed with cooperating, inwardly presented, lateral faces 8 through which side thrusts between the chain and the sprocket are transmitted, and by which the side faces of the teeth 3 are kept out of contact with the link and serious wear encountered in chains and sprockets as heretofore constructed is avoided. It will be noted that the surfaces 6 and 8 are continuous surfaces, the surfaces 6 on the sides of the sprocket wheel extending throughout the circumference of the wheel, and the surfaces 8 on the side rails 7 being substantially the length of the link; and when a series of links are connected in a chain, these link surfaces may be approximately continuous since the ends of the links may be brought into close proximity. Because the side rails of the links are substantially straight bottomed longitudinally, and engage a circular sprocket rim, it is obvious that the two surfaces contact only at the point of tangency, which, as seen from the drawing is approximately midway between the sprockets. Theoretically this contact would be only along a geometric line lying in a radial plane, but in practice, at least after a little wear, there is contact along a zone, which zone is however quite narrow circumferentially of the sprocket. It should be realized that the chief need for the special guides is when the tractor on which the invention is used is turning, or otherwise causing a lateral thrust on the links with respect to the sprocket. By having the contact point midway between the hubs the play is minimized so that contact between the teeth and the sides of the link is prevented. In the case of lateral bearing between teeth 3 and the inwardly presented surfaces of the links as in chains and sprockets as heretofore constructed, the teeth constitute effective cutting instruments which make the contact between them and the links very destructive to both said parts. The opposed faces 6 of the wheel and 8 of the links are preferably inclined to the plane of the wheel so that the rim 2 tapers outwardly and causes the parts to mate more readily and avoid the development of any bite between those edges of the rim and link which are presented radially outward and inward, respectively.

I claim:

1. A sprocket wheel having a rim constructed with teeth extending radially outwardly from said rim, in combination with a chain of links constructed with articulated hub members spaced apart in the direction of the circumference of the rim in positions to rest radially inwardly upon said rim and impinge, in the direction of the circumference of the wheel, against said teeth; said links being constructed with side rails connecting said hubs and extending radially inwardly into overlapping relation with said rim radially inward from said teeth, the engaging faces of said side rails and said rim being beveled, the beveled surfaces of the rim being circular, and the beveled surface of each side rail being substantially flat whereby each side rail may contact said rim in only a circumferentially narrow zone.

2. A sprocket wheel having a rim constructed with teeth extending radially outwardly from said rim, in combination with a chain of links constructed with articulated hub members spaced apart in the direction of the circumference of the rim in positions to rest radially inwardly upon said rim and impinge, in the direction of the circumference of the wheel, against said teeth; said links being constructed with side rails connecting said hubs and extending radially inwardly into overlapping relation with said rim radially inward from said teeth, the engaging faces of said side rails and said rim being beveled, the beveled surfaces of the rim being circular, and the beveled surface of each side rail being substantially flat and tangent to the curvature of the rim at a point substantially midway between said hubs whereby each side rail may contact said rim in only a circumferentially narrow zone at said point.

3. A sprocket wheel having a rim constructed with teeth extending radially outwardly from said rim, in combination with a chain of links constructed with articulated hub members spaced apart in the direction of the circumference of the rim in positions to rest radially inwardly upon said rim and impinge, in the direction of the circumference of the wheel, against said teeth; said links being constructed with side rails connecting said hubs and extending radially inwardly into overlapping relation with said rim radially inward from said teeth, the engaging faces of said side rails and said rim being beveled, and the circumferential curvature of the beveled surface of the rim being of smaller radius than any corresponding curvature of the beveled surface of the side rail whereby each side rail may contact said rim in only a circumferentially narrow zone.

4. A sprocket wheel having a rim constructed with teeth extending radially outwardly from said rim, in combination with a chain of links constructed with articulated hub members spaced apart in the direction of the circumference of the rim in positions to rest radially inwardly upon said rim and impinge, in the direction of the circumference of the wheel, against said teeth; said links being constructed with side rails connecting said hubs and extending radially inwardly into overlapping relation with said rim radially inward from said teeth, the engaging faces of said side rails and said rim being beveled, said beveled surfaces being the only surfaces subjected to lateral pressure.

CLAUDE RORABECK.